Patented Apr. 26, 1949

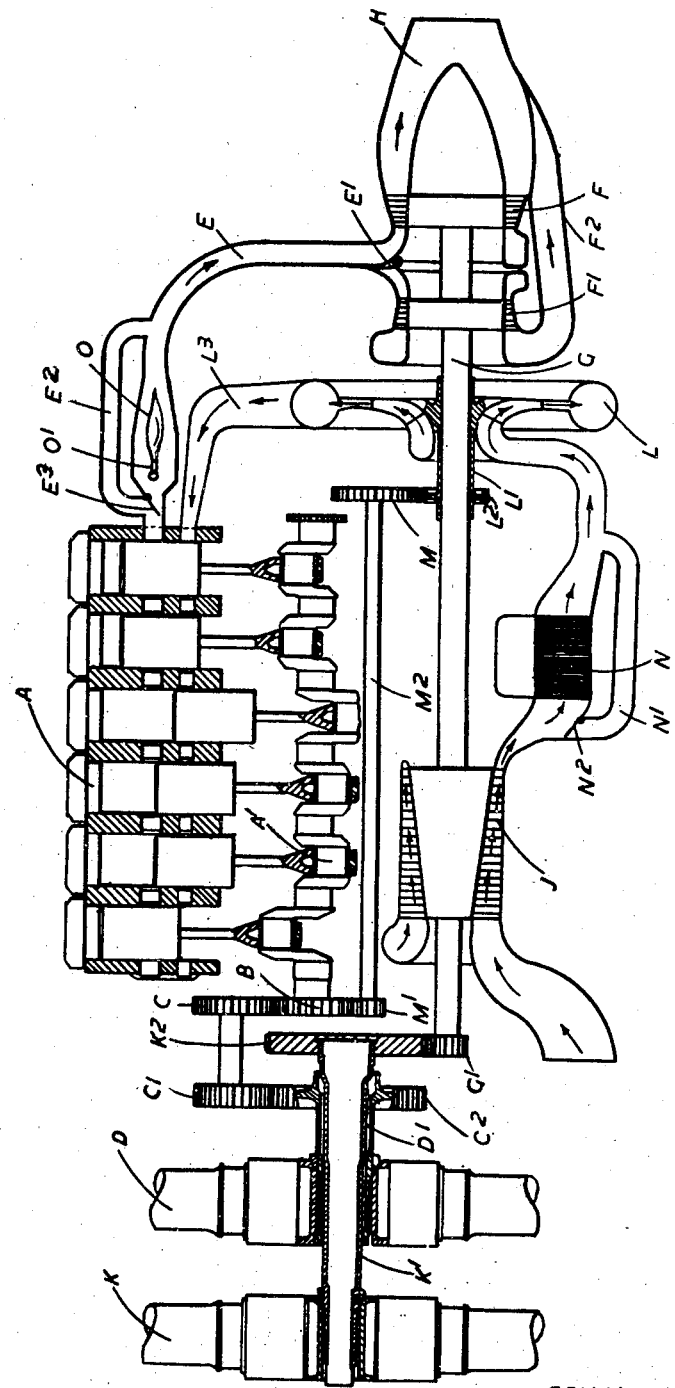

2,468,157

UNITED STATES PATENT OFFICE 2,468,157

INTERNAL-COMBUSTION ENGINE POWER PLANT

Benjamin William Barlow, Wembley, and Alfred John Penn, Pinner, England, assignors to D. Napier & Son Limited, London, England, a company of Great Britain Original application September 24, 1946, Serial No. 698,902. Divided and this application February 18, 1948, Serial No. 9,095. In Great Britain July 18, 1945

Section 1, Public Law 690, August 8, 1946

5 Claims. (Cl. 170—135.28)

This invention relates to internal combustion engine power plants and has for its object to provide a construction and arrangement of the main features in such a plant as is more especially suitable when the plant is used for the propulsion of aircraft. The improved power plant is of the general type in which an internal combustion engine operating on the two-stroke cycle produces gases utilized primarily to act on a turbine which drives a compressor and also a propeller the power then available as surplus being used in the internal combustion engine to drive a second compressor and a second propeller through the engine crankshaft; and this application is a division of an application filed September 24, 1946, by applicants jointly with Herbert Sammons, Serial No. 698,902.

According to the present invention, a power plant of the type referred to comprises in combination an internal combustion engine operating on the two-stroke cycle and preferably with compression ignition arranged to utilize air in the charge considerably in excess of that required for combustion, a propeller disposed with its axis parallel to the axis of the engine crankshaft from which it is driven through gearing by power available from the engine, a centrifugal compressor constantly delivering air directly to the engine by which it is driven through gearing, a turbine driven by the gases produced by the engine, an axial flow compressor driven by and mounted on the same shaft as the turbine and serving while the turbine is operative constantly to deliver supercharging air for the engine to the engine driven centrifugal compressor, and a propeller which is co-axial with the engine driven propeller and is driven through gearing from the turbine, wherein the turbine, the axial flow compressor driven thereby and the engine driven centrifugal compressor have a common axis of rotation parallel to the axis of the engine crankshaft.

Since the engine operates on the two-stroke cycle the air flow through it is considerably greater than in a four-stroke cycle engine, particularly a spark ignition engine in which the amount of air consumed is further limited by the necessity for having a favourable mixture strength. The increased quantity of air flowing through the engine has several advantages. In the first place the cooling of the engine is improved. Another advantage is that the mass of the gases flowing to the turbine, and hence the turbine output, is increased without having to mix fresh air with these gases and so reduce their temperature. This additional mass flow enables the turbine to produce an output sufficient to drive the said axial flow compressor and a propeller as well. Moreover, the excess air enables additional fuel to be burnt in the gases passing from the engine to the turbine to increase their temperature further.

In addition to the turbine which drives the axial flow compressor there is preferably provided a second turbine which is mounted either on the same shaft as the main turbine or on a separate shaft which is then connected through gearing to the shaft of the main turbine. By suitable means some portion of the gases produced in the engine can be diverted and caused to flow to and act on this second turbine which then supplements the power developed by the main turbine in driving the axial flow compressor and propeller.

A convenient arrangement is for the axial flow compressor to be placed either above or below the engine with its shaft which runs to the turbine by which it is driven passing through a hollow shaft on which is the centrifugal compressor driven through gearing from one end of the engine crankshaft. At the opposite end of this crankshaft is the gearing through which the engine drives the one propeller whose shaft is hollow and through it runs the shaft of the second propeller which is driven through gearing from the shaft of the turbine and axial flow compressor.

In a modified arrangement the impeller of the centrifugal compressor may be driven by the engine through a flexible shaft from the same end of the engine crankshaft through which the drive is transmitted through gearing to the propeller.

The air from the axial flow turbine-driven compressor is delivered to the engine-driven centrifugal compressor from which the air goes to the engine. An intercooler is conveniently provided and the air from the axial flow compressor may be caused to pass through this on its way to the centrifugal compressor, suitable valves enabling the intercooler to be cut out if desired. Alternatively means may be provided if desired for cutting off the supply of coolant. The axial flow compressor is of the multi-stage type and the centrifugal compressor may be regarded as functioning as a stage of the axial flow compressor.

The gases produced in the engine on their way to the turbine may be diverted and caused to pass through a chamber in which fuel may be burnt, this diversion being controlled by suitably arranged valves. Alternatively the gases may be arranged normally to pass through such a chamber in which fuel may be burned or turned off as desired.

The gases leaving the turbine may pass directly into the atmosphere or in so passing may be caused to issue through one or more jet nozzles with some propulsive effect, which is enhanced by the large mass flow of gas arising out of the use of a two-stroke cycle engine. In some cases the turbine may be a two-part one constituted by two separate turbine structures, namely a main turbine and a second or subsidiary one. This secondary turbine is then used to supplement the power of the main turbine in driving the axial flow compressor and the second propeller, as for instance at starting or at high power. The two parts of the turbine may be mounted on the same shaft or on separate shafts with gearing interposed between them.

The accompanying drawing illustrates diagrammatically and in longitudinal sectional elevation a power plant constructed and arranged according to this invention.

The internal combustion engine A through a gear wheel B on its crankshaft $A^1$ and the gearing, C, $C^1$, $C^2$, drives the propeller D which is carried on a hollow shaft $D^1$. The gases produced in the engine A are led through a pipe E to a turbine which comprises a main part F and a secondary turbine $F^1$ both parts being mounted on a common shaft G. The main flow of gases through the pipe E is directed through the turbine F these gases then issuing as a jet with reactive effect through the nozzle H. A valve $E^1$ in the piping E enables a portion of the gases to be diverted as and when desired and caused to pass through the second or auxiliary turbine $F^1$ from which the gases also flow to the jet nozzle H through the piping $F^2$. An axial flow compressor J is mounted on the shaft G and driven by the turbines F, $F^1$, and through a gear wheel $G^1$ on this shaft the turbines also drive a second propeller K whose shaft $K^1$ passes through the hollow shaft $D^1$ of the engine driven propeller D and carries a gear wheel $K^2$ meshing with the gear wheel $G^1$. A centrifugal compressor L on a sleeve $L^1$ is rotatably carried on the shaft G but is separately driven through a gear wheel $L^2$ and gear wheels M, $M^1$ on the opposite ends of shafting $M^2$, from the gear wheel B on the engine crankshaft $A^1$. The shafting $M^2$ is conveniently constructed so as to constitute a flexible drive for the compressor L. The air delivered by the turbine driven compressor J is delivered through an intercooler N to the engine driven compressor L which in turn delivers supercharging air through the passage $L^3$ to the engine A. The compressor J thus functions in effect with the compressor L as a multi-stage compressor. A by-pass passage $N^1$ with a valve $N^2$ enables the air from the compressor J to be diverted round the intercooler N if desired. Alternatively the by-pass passage $N^1$ may be omitted and means may be provided for controlling the supply of coolant to the intercooler N.

In the piping E through which the gases produced in the engine flow to the turbine there is conveniently arranged a combustion chamber O into which fuel may be delivered at $O^1$ and there burnt. A by-pass passage $E^2$ with a valve $E^3$ may be provided to enable the gases from the engine to flow directly to the turbine without passing through the combustion chamber. Alternatively the by-pass passage $E^2$ may be omitted so that all the gases pass through the combustion chamber, in which case means are provided for controlling the supply of fuel to the burner $O^1$.

What we claim as our invention and desire to secure by Letters Patent is:

1. A power plant comprising in combination an internal combustion engine operating on the two-stroke cycle and arranged to utilize air in the charge considerably in excess of that required for combustion, two propellers, gearing through which one of said propellers is driven by the said engine, a centrifugal compressor constantly supplying air directly to the said engine, gearing through which said compressor is driven by the said engine, the axis of the said compressor being parallel to and not coaxial with the engine crankshaft, a turbine driven by the gases produced in the said engine, the axis of the turbine being coincident with the axis of the said engine-driven compressor, an axial flow compressor the shaft of which is coaxial with, connected to and driven from the shaft which carries the said turbine, this compressor while the turbine is operative constantly delivering supercharging air for the engine to the said centrifugal compressor, and gearing through which the other of said propellers is driven by the said turbine.

2. A power plant comprising in combustion the parts as set out in claim 1 and in which the second and turbine-driven propeller is coaxial with the said engine-driven propeller.

3. A power plant comprising in combination an internal combustion engine operating on the two-stroke cycle and arranged to utilize air in the charge considerably in excess of that required for combustion, a propeller driven by the said engine, a centrifugal compressor constantly supplying air directly to the said engine by which it is driven, a turbine driven by the gases produced in the said engine, an axial flow compressor which is driven by the turbine and while the turbine is operative constantly delivers supercharging air for the engine to the said centrifugal compressor, a second propeller driven by the said turbine, and means whereby the gases after leaving the said turbine are delivered through at least one jet nozzle into the atmosphere so as to exercise a propulsive effect.

4. A power plant comprising in combination an internal combustion engine operating on the two-stroke cycle and arranged to utilize air in the charge considerably in excess of that required for combustion, two propellers, gearing through which one of said propellers is driven by the said engine, a centrifugal compressor constantly supplying air directly to the said engine, gearing through which said compressor is driven by the said engine, the axis of the said compressor being parallel to and not coaxial with the engine crankshaft, a turbine comprising two separately constructed parts mounted on and driving the same shaft and respectively driven by the gases produced in the said engine, a chamber through which the gases from the engine can be caused to pass on their way to the said turbine with means for burning fuel in this chamber, means for controlling the flow of the gases to one part of the said turbine so as to vary the amount of the gases flowing thereto, an axial flow compressor the shaft of which is coaxial with, connected to and driven from the shaft which carries the said two-part turbine, this compressor while the turbine is operative constantly delivering supercharging air for the engine to the said centrifugal compressor, and gearing through which the other of said propeller is driven by the said turbine.

5. A power plant comprising in combination an internal combustion engine operating on the two-stroke cycle arranged to utilize air in the charge considerably in excess of that required for combustion, two coaxial propellers, gearing through which one of said propellers is driven by the said engine, a centrifugal compressor constantly delivering air directy to the said engine, gearing through which said compressor is driven by the said engine, a turbine comprising two parts which are separate structures but mounted on and driving a common shaft each part being driven by gases produced in the said engine, means for controlling the flow of gases to one part of the said turbine so as to vary the amount of the gases flowing thereto, a chamber through which the gases from the engine can be caused to pass on their way to the said turbine with means for burning fuel in this chamber, means for controlling the supply of fuel to the said chamber, an axial flow compressor driven by the said turbine, the turbine, the axial flow compressor and the centrifugal compressor all having a common axis and this axis lying parallel to the axis of the engine crankshaft, the said axial flow compressor while the turbine driving it is operative constantly delivering air for supercharging the engine to the said engine-driven centrifugal compressor, an intercooler through which the air from the said turbine-driven compressor can be caused to pass on its way to the said engine-driven compressor, means for controlling the supply of coolant to the said intercooler, and gearing through which the other of said propellers is driven by the said turbine.

BENJAMIN WILLIAM BARLOW.
ALFRED JOHN PENN.

REFERENCES CITED

The following references are of record in the file of this patent:

UNITED STATES PATENTS

| Number | Name | Date |
|---|---|---|
| 2,356,557 | Anxionnaz et al. | Aug. 22, 1944 |
| 2,359,045 | Markwalder | Sept. 26, 1944 |
| 2,385,366 | Lusholm | Sept. 25, 1945 |
| 2,411,227 | Planiol et al. | Nov. 19, 1946 |
| 2,421,518 | Molloy | June 3, 1947 |
| 2,427,846 | Forsyth | Sept. 23, 1947 |
| 2,443,717 | Birmann | June 22, 1948 |

OTHER REFERENCES

SAE Journal (Transactions), vol. 53, No. 6, June 1945, pp. 345 to 351. ("Turbine Compounding With the Piston Engine," by C. F. Bachle.) Copy in 170–135.6B.